Nov. 6, 1962  B. H. SCHULTZ ET AL  3,062,989
CAPACITOR PROTECTIVE CIRCUIT AND APPARATUS
Filed May 22, 1957  2 Sheets-Sheet 1

INVENTORS.
DANIEL J. J. PIRHOFER
BLAINE H. SCHULTZ
STANLEY J. SPIECE
BY
Attorneys

INVENTORS.
DANIEL J. J. PIRHOFER
BLAINE H. SCHULTZ
BY STANLEY J. SPIECE

Andrus + Sceales
Attorneys

United States Patent Office 3,062,989
Patented Nov. 6, 1962

3,062,989
CAPACITOR PROTECTIVE CIRCUIT
AND APPARATUS
Blaine H. Schultz, South Milwaukee, and Stanley J. Spiece, Milwaukee, Wis., and Daniel J. J. Pirhofer, Glenview, Ill., assignors to McGraw-Edison Company, Milwaukee, Wis., a corporation of Delaware
Filed May 22, 1957, Ser. No. 660,923
8 Claims. (Cl. 317—12)

This invention relates to a capacitor protective circuit and apparatus particularly adapted to protect a voltage regulating capacitor for a distribution transformer.

It is conventional to connect a capacitor in series with the primary winding of an electrical transformer to improve the regulation of the secondary voltage of the transformer. If a short circuit condition arises on the secondary side of the transformer the low impedance is reflected to the primary winding. This results in a substantial increase of current flow through the primary winding and the series-connected capacitor. The voltage drop across the capacitor, which is directly proportional to the current, may reach an extremely high value and seriously damage or entirely destroy the capacitor.

A gap-electrode structure is often parallel connected with the capacitor to provide a by-pass circuit under conditions of a dangerous overvoltage. However, if a dangerously high voltage builds up across the capacitor due to a high fault current, the gap break down and the fault current flows through the arc across the spark gap, thereby bypassing the capacitor. In gap-electrode structure, moisture and other atmospheric conditions change the predetermined arcing characteristic of the structure and reduces its reliability. Further, the gap-electrode structure does not give an indication that a disturbance has occurred.

In accordance with the present invention, a short circuiting device is parallel connected in a normally open condition across the capacitor. Another parallel circuit across the capacitor includes a voltage sensitive device and a control device responsive to current flow in the voltage sensitive device. In the event of excessive capacitor voltage, the voltage sensitive device breaks down and immediately by-passes the capacitor. The current flow through the voltage sensitive device actuates the control device to close the short circuiting device. A time delay means is inserted into the operation of the protective circuit such that the in-rush transient currents occurring when the transformer is switched do not break down the voltage sensitive device. An indicating means is connected to the shorting mechanism such that upon actuation of the latter the indicating means is released.

The accompanying drawings illustrate the best mode presently contemplated by the inventor for carrying out the invention.

Figure 1:
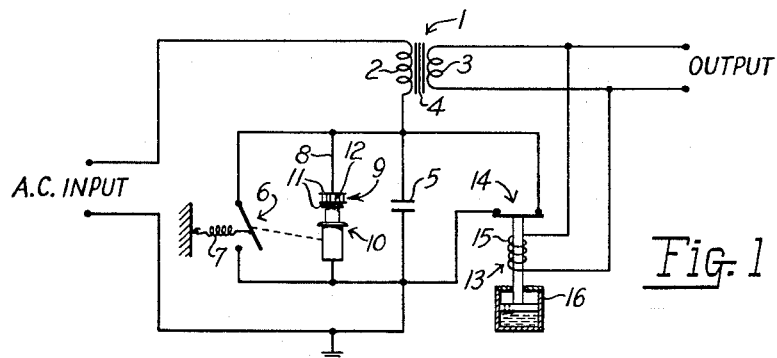
FIGURE 1 is a schematic circuit illustrating an embodiment of the present invention.

Referring to the drawings and particularly FIG. 1 a distribution transformer 1 includes a primary winding 2 which is connected to a suitable alternating current input and a secondary winding 3 which is connected to an alternating current load, not shown. The windings 2 and 3 are magnetically coupled by a transformer core 4. A capacitor 5 is connected in series with the grounded leg of the primary winding 2 principally for the purpose of improving the regulation of the secondary voltage of the transformer 1. A normally open by-pass or short-circuit switch 6 is connected in parallel with the capacitor 5 to by-pass the capacitor in the event a dangerously high voltage develops across the capacitor. The switch 6 is biased to a closed position by a spring 7 and is held open under normal operations against the spring bias as presently described.

A triggering branch circuit 8 is connected in parallel with the capacitor 5 and the switch 6. A film cutout 9 comprising a pair of plates 11 separated by an insulating medium 12 is connected in series with a thermal device 10 which is adapted to carry an electric current. Under normal capacitor voltage, the insulation 12 prevents current flow in the control branch circuit 8. However, under excessive capacitor voltage, the insulation 12 punctures to immediately by-pass and protect the capacitor 5. The thermal device 10 mechanically holds the switch 6 in a normally open state against the bias of spring 7. However, the current flow in film cutout 9 establishes a source of heat which trips the device 10 and allows the spring 7 to close the switch 6 and positively by-pass the capacitor 5. The thermal device 10 requires a manual reset, or replacement, to again open the switch 6.

A positive by-pass switch 6 provides a very low resistance short circuit across the capacitor 5 and reduces the heat generated by the flow of fault current to a minimum after actuation of the thermal device 10.

During the switching of a distribution transformer having a capacitor in series with the primary winding thereof, the phenomena of ferroresonance creates momentary current surges in the primary circuit and may result in high voltages which will break down the insulation 12 unless otherwise prevented from doing so.

This break down of insulation 12 is prevented in the illustrated embodiment of the invention by a time limit relay 13 which includes a set of normally closed contacts 14 short-circuiting the capacitor 5 and branch circuit 8. A relay winding 15 of relay 13 is connected across the secondary winding 3 of the transformer 1 and electromagnetically controls the relay contacts 14. The relay 13 includes any suitable mechanism, such as a fluid filled dashpot mechanism 16, which inserts a short delay in the opening of the relay contacts 14 after the energization of winding 15. However, the mechanism is such as to allow a rapid return in the closing of the contacts. Therefore, when the transformer 1 is connected to the A.-C. input, the momentary in-rush of primary current flows through the contacts 14 and harmlessly around the capacitor 5. After a short period of time, during which time the primary current decreases to a normal value, the time limit relay 13 opens the associated relay contacts 14.

If the primary circuit is broken, the relay 13 is de-energized. The contacts 14 of relay 13 rapidly close to shunt the branch circuit 8 and prevent breakdown of the cutout 9 during a subsequent reconnection of the primary circuit.

Referring to FIGS. 2–5, a unitary protective device incorporating the short circuit switch 6 and the control branch 8 is provided in a single, compact assembly. A rectangular housing 17 of suitable electrically insulating material protects the electrical components from foreign elements. The housing 17 includes a metallic end member 18 having a threaded mounting opening 19 to permit mounting of the housing directly on a correspondingly threaded capacitor terminal, not shown.

The capacitor is preferably mounted with the terminals, not shown, depending from its lower surface. The housing 17 is threaded onto one of the capacitor terminals and would then appear in an inverted position from that shown in FIGS. 2 and 3.

Switch 6 of FIGURE 1, as shown in FIGS. 2–5, includes a stationary contact plate 20 and a leaf spring contact member 21. The contact plate 20 is secured to the vertical wall 22 of housing 17 by a lead connecting bolt assembly 23 which is connected by a jumper lead, not shown, to the line capacitor terminal, not shown, and not connected to the end member 18. A horizontal projection 24 on the upper end of plate 20 extends inwardly of the housing and terminates generally centrally of the housing 17. The leaf spring contact 21 is provided with a base 25 which is secured to the metallic end member by screws 26. The leaf spring contact 21 extends upwardly within housing 17 and is provided with a vertically disposed portion 27 lying opposite the end of projection 24. A leaf spring 28, corresponding to spring 7 of FIG. 1, is also secured to the cover 18 by screws 26. The leaf spring extends upwardly behind the leaf spring contact 21 and the upper end of spring 28 is bifurcated to establish spring arms 29 as most clearly shown in FIG. 3. The ends of the arms 29 are bent as at 30 to provide bearing surfaces engaging the back surface of the spring contact 21. The spring 28 biases the spring contact 21 toward stationary contact 20 to engage contact portion 27 and the end of contact projection 24, as shown by the dotted lines in FIG. 2.

Normally the thermal device 10 mechanically holds the spring contact 21 in spaced relation to contact 20 against the bias of spring 28, as presently described.

Figure 2:
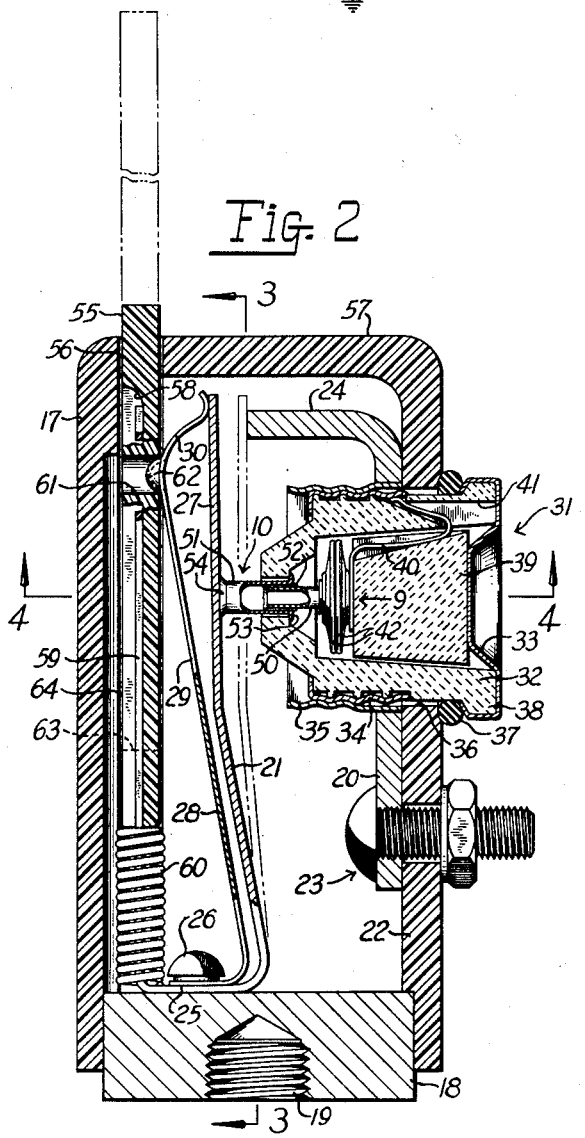
FIG. 2 is a cross-sectional view of a compact unitary protective assembly.
Figure 5:
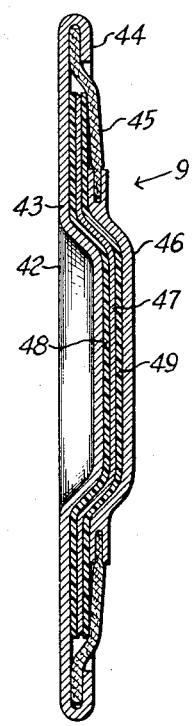
FIG. 5 is an enlarged cross-sectional view of a film cutout of the assembly of FIGS. 2–4.
Figure 4:
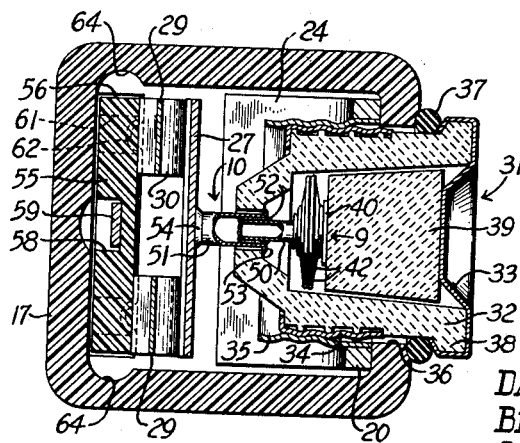
FIG. 4 is a view taken on line 4—4 of FIG. 2.

Referring to FIGS. 2 and 4 of the drawings, an expendable triggering insert or cartridge 31 is removably secured within the housing 17 and encloses the film cutout 9 and the thermal device 10 of control branch 8. The insert 31 includes a porcelain casing 32 which is generally shaped similar to the conventional screw-type household fuse. A stamped metal cover 33 closes the outer end of casing 32 and a metallic bushing 34 engages threads on the outer surface of the casing 32. The bushing 34 engages a threaded metallic socket or receptacle 35 to establish an electrical path therebetween. The receptacle 35 is secured at one end within an opening in contact 20 and extends inwardly of housing 17, which is provided with an aligned opening 36 for receiving the casing 32. A sealing gasket 37 is disposed between the housing 17 and a flange portion 38 of the casing 32 to seal the opening 36 when the insert 31 is threaded within the receptacle 35. A porcelain spacer 39 is disposed within the casing 32 to clamp the film cutout 9 and the thermal device 10 in place, as hereinafter described. Referring to FIG. 2, a copper jumper strap 40 has one end clamped between an electrode of the film cutout 9 and the adjacent end of the porcelain spacer 39 and extends outwardly therefrom through an opening 41 in the wall of casing 32 to the metallic bushing 34. The opposite end of copper strap 40 is soldered to the metallic bushing 34 to provide a current path into the insert 31 and to the film cutout 9.

Figure 3:
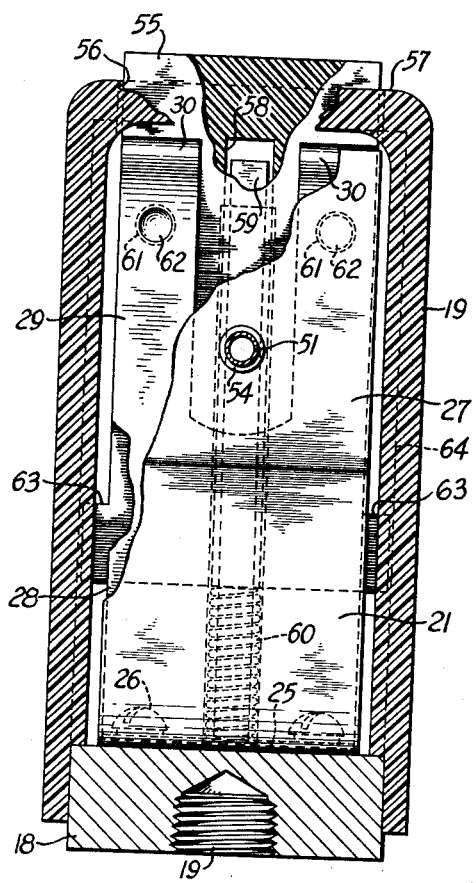
FIG. 3 is a view taken on line 3—3 of FIG. 2.

The film cutout 9 shown assembled in FIGS. 2 and 3 comprises a pair of individual electrical cutout members 42 clamped or otherwise secured in back-to-back relation. As shown more clearly in FIG. 5, each individual film cutout member 42 includes a base contact 43 having an outer flange or rim 44 with a disc paper support 45 secured by the rim 44. A button electrode or contact 46 is supported within a central opening in the paper disc 45. Disposed between the contact 43 and the contact 46 is a conducting disc 47 which has insulating coatings 48 and 49 on opposite surfaces. The insulating coatings 48 and 49 may be any suitable dielectric substance which normally prevents current flow between contacts 43 and 46 such as a varnish impregnated paper. However, a high voltage applied across the contacts 43 and 46 punctures the coatings 48 and 49 and establishes a short circuit therethrough.

A pair of back-to-back cutout elements 42 are shown to illustrate that the desired breakdown voltage can be varied by the number of film cutout elements connected in series.

The thermal device 10 shown in FIGS. 2–4 include a metallic shaft 50 telescoped within a metallic tube 51. An alloy 52 which melts at a relatively low temperature secures the shaft 50 and tube 51 together in a relatively extended relation. The shaft 50 contacts one of the button electrodes 46 to connect the shaft 50 and tube 51 in electrically series connection with the film cutout 9 and strap 40. The tube 51 extends through an opening in the inner end of the porcelain casing 32 and is provided with a shoulder 53 at its inner end which engages the inner base surface of the casing 32 and in cooperation with spacer 39 clamps the film cutout 9 and thermal device 10 within the casing 32. The extended end of tube 51 engages a boss 54 on movable spring contact 21 and holds the contact 21 disengaged from the contact 20 against the bias of leaf spring 28. The copper jumper strap 40 establishes a parallel branch circuit across contacts 20 and 21 as follows: starting with mounting bolt 23, contact plate 20, threaded receptacle 35 and bushing 34, copper strap 40, the film cutout assembly 9, shaft 50 and tube 51 via alloy 52 to the leaf contact 21.

The film cutout 9 normally maintains this parallel path in open circuit condition. However, a high voltage condition across the capacitor breaks down the insulation 48 and 49, shown in FIG. 5 in each division or subunit 42 in the film cutout 9, and allows current flow therethrough. The capacitor 5 is then shunted from the circuit. The internal resistance of the film cutout 9 drops when punctured from an infinite value to several ohms. The flow of fault current through the several ohms generates heat which is conducted to the low temperature alloy 52 by the shaft 50. The low temperature alloy 52 melts and the metallic tube 51 collapses onto the shaft 50 under the action of the leaf spring 28. The spring 28 pushes the leaf contact 21 into engagement with the projection 24 of contact plate 20 as shown in phantom outline in FIG. 2 and establishes a by-pass circuit around the capacitor 5. This positively by-passes the capacitor 5 from the circuit until insert 31 is replaced.

Referring particularly to FIGS. 2 and 3, a visual plate indicator 55 is slidably disposed within a slot 56 in the end wall 57 of the housing 17. A vertical guide slot 58 in the back of the plate indicator 55 slidably engages a corresponding extension 59 of the contact plate 21 which extends vertically behind the spring 28 from the base 25 of the contact plate. A coil spring 60 encircling the extension 59 rests on the metallic member 18 and engages the end of plate 55 to bias the plate outwardly to the phantom line position seen in FIG. 2 where it is visually observable. The indicating plate 55 is provided with a pair of openings 61 adjacent the upper end of the plate. A stamped projection 62 is formed in each of the arms 29 of leaf spring 28 and engages a respective opening 61 when the indicator is depressed into the housing and when the leaf spring 28 is biased rearwardly under the action of the thermal device 10 to hold contact 21 disengaged from contact 20. The indicator 55 is latched within the housing as long as contact 21 and contact 20 are disengaged. When the thermal device 10 is actuated and the leaf spring 28 is released, the indicator 55 is also released and moves outwardly of the housing 17 under the influence of the coil spring 60 as shown by the phantom outline in FIG. 2 to give a visual indication that the capacitor is by-passed. As shown most clearly in FIG. 3, laterally extended ears 63 are integrally formed one with each side of the plate 55 adjacent the inner end of the indicator plate 55. The ears 63 engage the end wall 57 of the housing 17 when the indicator 55 is released and prevent the indicator from being expelled from the housing 17. A guide slot 64 is provided one in each of the side walls of the housing 17 to receive the ears 63 and maintain vertical alignment of the indicator 55.

Although not shown in FIGS. 2–5, the timing relay 13 may also be mounted within housing 17 and have the relay contacts 14 connected to the respective mounting screws 23 and 26 to establish a shunt path across the capacitor 5 when the transformer is de-energized. Other current conditioned elements and/or voltage-sensitive elements than those illustrated in the preferred embodiment may be employed within the scope of the present invention. For example, a bi-metallic element responsive to the heat generated due to current flow after breakdown of an electric cutout may be employed to produce the necessary mechanical displacement to close the short circuiting device.

The present invention provides a positive by-pass of the capacitor in the event of damaging disturbances. It further provides simple, economical and replaceable assemblies for protection of capacitors.

Various modes of carrying out the invention are contemplated as being within the scope of the following claims particularly pointing out and distinctly claiming the subject matter which is regarded as the invention.

We claim:

1. A protective circuit for a series capacitor connected in series with the primary winding of an electrical transformer, which comprises by-pass contact members adapted to be connected in parallel with the capacitor, means to bias said contact members to an engaged position by-passing the current around the capacitor, an electric cut-out adapted to be connected across the capacitor and having an insulating member punctured by a predetermined voltage across said capacitor incident to abnormal current flow through the capacitor to by-pass said capacitor, means operatively associated with said contact members to hold the contact members disengaged against said biasing means and responsive to current flow through said electric cutout to release said contact members to establish a low resistance by-pass across said capacitor, and circuit shorting means adapted to be connected in parallel with the capacitor and having a time delay in operation, said shorting means being adapted to be electrically connected to the secondary winding of the transformer and actuated in response to the energization of the primary winding to prevent puncturing of the electric cutout during switching in the primary circuit.

2. A protective device to by-pass a series capacitor, a housing adapted to be mounted on one terminal of the capacitor, a pair of contact members mounted within the housing and biased toward an engaged position, terminal means carried by said housing and adapted to permit connection of said contact members across said capacitor terminals, a socket having an electrode connected to one of said contact members, an expendable cartridge releasably secured within the socket, a film cutout secured within the expendable cartridge and electrically connecting said electrode to the other of said contact members, said film cutout being punctured by a capacitor voltage incident to a predetermined abnormal fault current flowing through said capacitor and establishing a by-pass circuit for generating heat as a result of the current through the film cutout, and thermal means mounted within said cartridge and engaging one switch contact and holding said switch contacts disengaged, said thermal means being coupled to the film cutout and responsive to the heat generated as a result of the current flow through said film cutout to release said switch contacts and positively by-pass said capacitor.

3. In a capacitor protective device adapted to by-pass a capacitor in response to a predetermined voltage drop across the capacitor, an electrically insulating housing having an opening in one wall, a pair of relatively movable contact members disposed within the housing and adapted to be connected in parallel circuit with said capacitor to by-pass the capacitor, said contact members being biased to an engaged position, one of said contact members being disposed adjacent the opening, the other of said contact members being disposed in spaced relation to the first contact member and partially closing the opening, a unitary control member including a voltage sensitive device and a triggering device in series connection, said control member having a first and a second terminal means corresponding to the end terminals of said series connection, and means to removably mount said control member within said housing opening with said first and second terminal means respectively connected one to each of said contact members, said voltage sensitive device including means to normally prevent current flow therethrough and being responsive to said predetermined voltage drop across the capacitor to conduct current, said triggering device including a movable element engaging the contact member partially closing the opening and mechanically holding said latter contact member in spaced relation to the other contact member in the assembled position of the control member and means responsive to a current flow in said voltage sensitive device to release said contact members and positively by-pass current around the capacitor.

4. In a capacitor protective device adapted to by-pass a capacitor in response to a predetermined voltage drop across the capacitor, an electrically insulating housing having an opening in one wall, a pair of relatively movable contact members disposed within the housing and adapted to be connected across the capacitor, the first of the contact members being secured adjacent the opening, the second of the contact members being secured in spaced aligned relation to the first contact member and having a portion disposed in front of the opening, biasing means to bias the second contact member toward the first contact member, an expendable actuator adapted to extend through said opening, a releasable support electrically connected to said first named contact member and adapted to releasably hold the actuator within the opening, said actuator including a pair of extendible members held in a relatively extended relation by a heat disruptible means and engaging said second contact member to hold said contact members disengaged and including a voltage sensitive device connected in a series circuit with said extendible members and electrically connected to said first contact member, said voltage sensitive device normally being non-conducting and being responsive to said predetermined voltage drop across the capacitor to conduct current and immediately by-pass the fault current through said voltage sensitive means and said extendible members, said fault current generating heat to disrupt said heat disruptible means whereupon said extendible members collapse and said contact members are engaged to establish a low resistance by-pass across said capacitor, and indicating means responsive to closing of said contact members to indicate actuation of the device.

5. A capacitor protective device adapted to by-pass a capacitor in response to a predetermined voltage drop across the capacitor, an electrically insulating housing having an opening, a first contact member mounted adjacent the opening and having a lateral extension terminating within the housing, a leaf contact member mounted within the housing in spaced relation to the first contact member and adapted to move into engagement with the end of said lateral extension, said first contact member and said leaf contact member being adapted to be connected across the capacitor, spring means biasing the leaf contact member into an engaging position with the first contact member, an electromechanical device adapted to engage said leaf contact member and releasably hold the leaf contact member in a disengaging position, a film cutout connected in a series circuit with said electromechanical device, said electromechanical device being responsive to current flow through said film cutout to release said leaf contact member, a common support for said electromechanical device and said film cutout, means to removably mount the common support within said housing with one end of the series circuit connected to said one contact member and the opposite end of the series circuit connected to the other contact member, a visual indicator slidably disposed within an opening in the housing, means biasing the indicator outwardly of the housing, and latch means interconnecting said indicator and leaf contact member to hold said indicator within the housing when the leaf contact member is in a disengaged position and to release said indicator when the leaf contact member is in an engaged position.

6. A replaceable cutout adapted to hold open a short circuiting switch connected in parallel with a capacitor, said short circuiting switch having a housing insulating the switch from foreign elements, which comprises a tubular support of electrically insulating medium, a metallic threaded member secured to the outer surface of the support, a metal receptacle secured to one contact of the short circuiting switch and threaded to support the threaded member and tubular support to dispose one end of the tubular support adjacent the other contact of the short circuiting switch, a film cutout rigidly mounted within said support and having one terminal connected to said threaded member, a pair of extendible members one of which is secured to a second terminal of the film cutout to electrically connect the extendible members in series with said film cutout and the second of which extends outwardly of the tubular support into mechanical and electrical engagement with the second contact of the short circuiting switch, and fusible means disposed between said extendible members and holding said members in relatively extended relation, said fusible means being disrupted when current flows through said film cutout to allow said extendible members to collapse, and said film cutout being punctured by a predetermined voltage drop across said capacitor to complete said current circuit through said fusible means.

7. A protective circuit for a capacitor connected in series with electrical apparatus, which comprises normally open short-circuiting means for connection in parallel with said capacitor, electric cutout means for connection in parallel with said capacitor and having an insulating member preventing flow of current through the cutout means under normal voltage across said capacitor and being permanently punctured in response to a selected abnormal voltage across the capacitor to bypass the capacitor, said cutout means maintaining the corresponding circuit conductive and permanently shunting the capacitor in the punctured state and constituting a heat source when current flows therethrough, and thermal means heat conductively connected to the electric cutout means and responsive to the heat generated by the current through said electric cutout and conductively transmitted to said thermal means to close said short circuiting means and establish a low resistance bypass circuit across said capacitor.

8. In a protective device for bypassing a capacitor in response to a predetermined voltage drop across the capacitor, a switch assembly having contact members biased to a closed position and adapted to be connected in parallel with said capacitor, an expendable cartridge for mounting on said switch assembly and having a voltage sensitive device connected in parallel with said capacitor and said switch contact members upon mounting of the cartridge on the switch assembly and responsive to said predetermined capacitor voltage drop to bypass said capacitor, support means on the switch assembly for receiving and supporting the expendable cartridge adjacent the contact members, and a triggering device carried by the expendable cartridge and directly opening said contact members upon insertion of the expendable cartridge in said support means and responsive to fault current through said voltage sensitive device to release said contact members and establish a low resistance bypass across said capacitor.

References Cited in the file of this patent

UNITED STATES PATENTS

| | | |
|---|---|---|
| 768,196 | Rolfe | Aug. 23, 1904 |
| 1,252,942 | Parker | Jan. 8, 1918 |
| 1,580,516 | Marbury | Apr. 13, 1926 |
| 1,787,181 | Traver | Dec. 30, 1930 |
| 1,998,403 | Weigel | Apr. 16, 1935 |
| 2,125,077 | Marbury | July 26, 1938 |
| 2,307,598 | Marbury | Jan. 5, 1943 |
| 2,323,702 | Berkey | July 6, 1943 |
| 2,323,720 | Marbury | July 6, 1943 |
| 2,371,496 | Bennet | Mar. 13, 1945 |
| 2,783,410 | Manke | Feb. 26, 1957 |
| 2,788,422 | Marbury | Apr. 9, 1957 |
| 2,799,807 | Schultz | July 16, 1957 |
| 2,809,256 | Bullinger | Oct. 8, 1957 |
| 2,878,428 | Bockman | Mar. 17, 1959 |